United States Patent
Hur et al.

(10) Patent No.: US 9,394,403 B2
(45) Date of Patent: Jul. 19, 2016

(54) POLYCARBONATE RESIN, PRODUCTION METHOD FOR SAME, AND MOLDED ARTICLE COMPRISING SAME

(71) Applicant: Cheil Industries Inc., Gumi-si (KR)

(72) Inventors: Jong Chan Hur, Uiwang-si (KR); O Sung Kwon, Uiwang-si (KR); Il Hwan Yang, Uiwang-si (KR); Dong Geun Lee, Uiwang-si (KR); Bok Nam Jang, Uiwang-si (KR); Jun Ho Chi, Uiwang-si (KR); Woo Suk Chei, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/647,640

(22) PCT Filed: Jan. 30, 2013

(86) PCT No.: PCT/KR2013/000729
§ 371 (c)(1),
(2) Date: May 27, 2015

(87) PCT Pub. No.: WO2014/092243
PCT Pub. Date: Jun. 19, 2014

(65) Prior Publication Data
US 2015/0299388 A1 Oct. 22, 2015

(30) Foreign Application Priority Data

Dec. 11, 2012 (KR) .................. 10-2012-0143947

(51) Int. Cl.
| | | |
|---|---|---|
| *C08G 64/00* | (2006.01) | |
| *C08G 64/16* | (2006.01) | |
| *C08G 64/02* | (2006.01) | |
| *C08G 64/04* | (2006.01) | |
| *C08G 64/20* | (2006.01) | |
| *C08L 69/00* | (2006.01) | |
| C08G 63/02 | (2006.01) | |

(52) U.S. Cl.
CPC ............ *C08G 64/1608* (2013.01); *C08G 64/02* (2013.01); *C08G 64/04* (2013.01); *C08G 64/20* (2013.01); *C08L 69/00* (2013.01)

(58) Field of Classification Search
CPC .............................. C08G 64/307; C08G 64/06
USPC .................... 528/196, 198, 271, 272, 279
See application file for complete search history.

(56) References Cited

U.S. PATENT DOCUMENTS

| | | | |
|---|---|---|---|
| 6,395,364 B1 | 5/2002 | Davis et al. | |
| 7,317,067 B2 | 1/2008 | Ikeda et al. | |
| 7,671,169 B2 * | 3/2010 | Mullen | C08G 63/08 |
| | | | 525/146 |
| 7,759,456 B2 | 7/2010 | Brack et al. | |
| 8,470,934 B2 | 6/2013 | Heuer et al. | |
| 8,674,053 B2 | 3/2014 | Isahaya et al. | |
| 8,691,902 B2 | 4/2014 | Grcev et al. | |
| 2006/0036035 A1 | 2/2006 | Govaerts et al. | |
| 2008/0015291 A1 | 1/2008 | Siripurapu et al. | |
| 2010/0159211 A1 | 6/2010 | Blackburn et al. | |
| 2010/0160575 A1 | 6/2010 | Goossens et al. | |
| 2011/0281995 A1 | 11/2011 | Ha et al. | |
| 2012/0052425 A1 | 3/2012 | Jun et al. | |
| 2012/0100474 A1 | 4/2012 | Hikosaka et al. | |
| 2012/0165425 A1 | 6/2012 | Park et al. | |
| 2013/0030094 A1 | 1/2013 | Uchimura et al. | |
| 2014/0171583 A1 * | 6/2014 | Hur | C08L 69/00 |
| | | | 524/537 |

FOREIGN PATENT DOCUMENTS

| | | |
|---|---|---|
| CN | 102093685 A | 6/2011 |
| CN | 102822233 A | 12/2012 |
| EP | 2199076 A1 | 6/2010 |
| JP | 06-248066 A | 9/1994 |
| JP | 2011-105931 A | 6/2011 |
| KR | 10-1093371 B1 | 6/1999 |
| KR | 10-2003-0022340 A | 3/2003 |
| KR | 10-2004-0102362 A | 12/2004 |
| KR | 10-2009-0026339 A | 3/2009 |
| KR | 10-2012-0031179 A | 3/2012 |
| KR | 10-2012-0073818 A | 7/2012 |
| KR | 10-2012-098773 A | 9/2012 |
| WO | 2014/092243 A1 | 6/2014 |
| WO | 2014/104484 A1 | 7/2014 |

OTHER PUBLICATIONS

International Search Report in counterpart International Application No. PCT/KR2013/000729 dated Jul. 4, 2013, pp. 1-4.
Office Action in counterpart Korean Application No. 10-2012-0143947 dated Apr. 13, 2015, pp. 1-6.
International Search Report in commonly owned International Application No. PCT/KR2013/002697 dated Jun. 26, 2013, pp. 1-4.
Office Action in commonly owned Chinese Application No. 2013105461902 dated May 12, 2015, pp. 1-2.
English-translation of Office Action in commonly owned Chinese Application No. 2013105461902 dated May 12, 2015, pp. 1-2.
Non-Final Office Action in commonly owned U.S. Appl. No. 14/652,160 mailed Oct. 9, 2015, pp. 1-12.

(Continued)

*Primary Examiner* — Terressa Boykin

(74) *Attorney, Agent, or Firm* — Additon, Higgins & Pendleton, P.A.

(57) ABSTRACT

The polycarbonate resin of the present invention comprises: a repeating unit represented by formula 1 of claim 1; and a repeating unit represented by formula 2 of claim 1. The polycarbonate resin has excellent scratch resistance, transparency and tensile elongation.

12 Claims, No Drawings

(56) References Cited

OTHER PUBLICATIONS

Non-Final Office Action in commonly owned U.S. Appl. No. 14/044,941 mailed Sep. 25, 2014, pp. 1-8.
Final Office Action in commonly owned U.S. Appl. No. 14/044,941 mailed Feb. 9, 2015, pp. 1-7.
Advisory Action in commonly owned U.S. Appl. No. 14/044,941 mailed Apr. 14, 2015, pp. 1-6.
Non-Final Office Action in commonly owned U.S. Appl. No. 14/044,941 mailed Jul. 27, 2015, pp. 1-6.
Notice of Allowance in commonly owned U.S. Appl. No. 14/044,941 mailed Nov. 6, 2015, pp. 1-5.

* cited by examiner

POLYCARBONATE RESIN, PRODUCTION METHOD FOR SAME, AND MOLDED ARTICLE COMPRISING SAME

CROSS-REFERENCE TO RELATED APPLICATIONS

This application claims priority to and the benefit of International Application No. PCT/KR2013/000729, filed Jan. 30, 2013, which published as WO 2014/092243 on Jun. 19, 2014, and Korean Patent Application No. 10-2012-0143947, filed in the Korean Intellectual Property Office on Dec. 11, 2012, the entire disclosure of each of which is incorporated herein by reference.

TECHNICAL FIELD

The present invention relates to a polycarbonate resin, a method of preparing the same, and a molded article including the same. More particularly, the present invention relates to a polycarbonate resin having excellent properties in terms of scratch resistance, transparency and tensile elongation, a method of preparing the same, and a molded article including the same.

BACKGROUND ART

Polycarbonate resins are a representative thermoplastic resin that has a heat deflection temperature of 135° C. or higher and exhibits superior mechanical properties including impact resistance and excellent properties in terms of self-extinguishing properties, dimensional stability, heat resistance, and transparency.

Polycarbonate resins are widely used in various applications such as exterior materials of electronic and electric products, office machines, automobile components, optical materials for various lenses, prisms, optical fibers, and the like.

However, polycarbonate resins have limitations in use for optical films due to poor scratch resistance. A polycarbonate film can be coated with a scratch-resistant film in order to improve scratch resistance of polycarbonate resins. In this case, an expensive scratch-resistant film and an additional coating process can cause an increase in manufacturing costs.

Therefore, studies on various methods have been conducted to improve scratch resistance of polycarbonate resins. Blending polycarbonate resins with a scratch-resistant resin is generally used as a method for improving scratch resistance of polycarbonate resins.

However, this method can only slightly improve scratch resistance and thus fundamental measures are necessary. In particular, when polycarbonate resins are blended with acrylic resins to improve scratch resistance, impact resistance of the polycarbonate resins can be drastically reduced, and compatibility between the blended resins can considerably increase haze, thereby damaging transparency of the polycarbonate resins.

Therefore, there is needed for a polycarbonate resin having excellent scratch resistance without deterioration in inherent physical properties, such as impact resistance and transparency.

DISCLOSURE

Technical Problem

It is one aspect of the present invention to provide a polycarbonate resin having excellent scratch resistance, transparency and tensile elongation and a method of preparing the same.

It is another aspect of the present invention to provide a molded article including the polycarbonate resin.

The above and other aspects of the present invention can be achieved by the present invention described below.

Technical Solution

One aspect of the present invention relates to a polycarbonate resin. The polycarbonate resin includes a repeat unit represented by Formula 1; and a repeat unit represented by Formula 2:

[Formula 1]

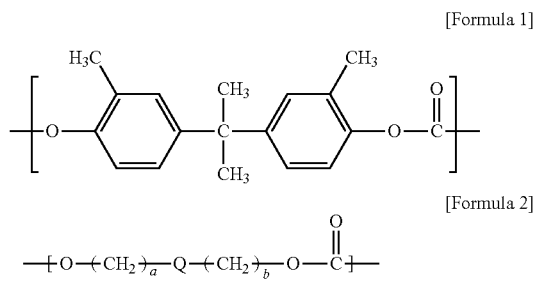

[Formula 2]

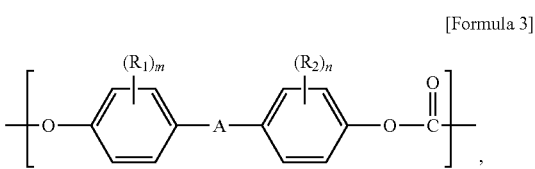

in Formula 2, Q is a substituted or unsubstituted $C_5$ to $C_{10}$ cyclic alkylene group, and a and b are each independently an integer from 0 to 4.

In one embodiment, the repeat unit represented by Formula 1 may be present in an amount of about 5 mol % to about 95 mol %, and the repeat unit represented by Formula 2 may be present in an amount of about 5 mol % to about 95 mol %.

In one embodiment, the polycarbonate resin may further include a repeat unit represented by Formula 3:

[Formula 3]

in Formula 3, A is a single bond, a substituted or unsubstituted $C_1$ to $C_{30}$ hydrocarbon group, an O or S-containing $C_1$ to $C_{30}$ hydrocarbon group, a halogen acid ester group, a carbonic acid ester group, CO, S or $SO_2$; $R_1$ and $R_2$ are each independently a substituted or unsubstituted $C_1$ to $C_6$ alkyl group; and m and n are each independently an integer from 0 to 4.

The repeat unit represented by Formula 3 may be present in an amount of about 0.01 to about 250 parts by mole based on 100 parts by mole of the repeat units represented by Formulae 1 and 2.

In one embodiment, the polycarbonate resin may have a scratch width of about 310 μm or less, as measured by a ball-type scratch profile (BSP) test.

In one embodiment, the polycarbonate resin may have a tensile elongation of about 40% to about 100% at 25° C.

In one embodiment, the polycarbonate resin may have a pencil hardness of F or higher.

Another aspect of the present invention relates to a method of preparing the polycarbonate resin. The method includes reacting a carbonate precursor with a diol mixture containing a diol(3,3'-dimethyl bisphenol A (DMBPA)) represented by Formula 4 and a diol represented by Formula 5:

[Formula 4]

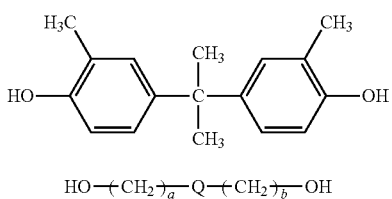

[Formula 5]

HO─(CH$_2$)$_a$─Q─(CH$_2$)$_b$─OH in Formula 5, Q is a substituted or unsubstituted $C_5$ to $C_{10}$ cyclic alkylene group, and a and b are each independently an integer from 0 to 4.

In one embodiment, the diol represented by Formula 4 may be present in an amount of about 5 mol % to about 95 mol % in the entire diol mixture, and the diol represented by Formula 5 may be present in an amount of about 5 mol % to about 95 mol % in the entire diol mixture.

In one embodiment, the diol mixture may further include an aromatic dihydroxy compound represented by Formula 6:

[Formula 6]

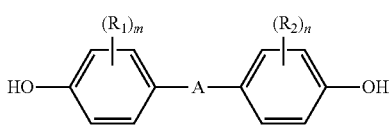

in Formula 6, A is a single bond, a substituted or unsubstituted $C_1$ to $C_{30}$ hydrocarbon group, an O or S-containing $C_1$ to $C_{30}$ hydrocarbon group, a halogen acid ester group, a carbonic acid ester group, CO, S or $SO_2$; $R_1$ and $R_2$ are each independently a substituted or unsubstituted $C_1$ to $C_6$ alkyl group; and m and n are each independently an integer from 0 to 4.

The aromatic dihydroxy compound represented by Formula 6 may be present in an amount of about 0.01 to about 250 parts by mole based on 100 parts by mole of the diols represented by Formulae 4 and 5.

A further aspect of the present invention relates to a molded article including the polycarbonate resin.

Advantageous Effects

The present invention provides a polycarbonate resin having excellent scratch resistance, transparency and tensile elongation, a method of preparing the same, and a molded article including the same. The polycarbonate resin may be used without a protective film due to excellent scratch resistance, be formed into a roll-shaped film due to excellent tensile elongation, and be useful as an optical material, particularly for an optical film, due to excellent transparency.

BEST MODE

Hereinafter, embodiments of the present invention will be described in detail as follows.

A polycarbonate resin according to the present invention includes a repeat unit represented by Formula 1 and a repeat unit represented by Formula 2 in a main chain thereof

[Formula 1]

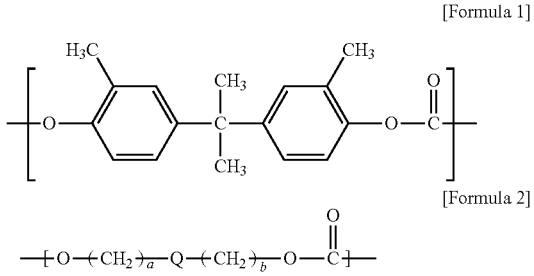

[Formula 2]

─(O─(CH$_2$)$_a$─Q─(CH$_2$)$_b$─O─C(=O))─

In Formula 2, Q is a substituted or unsubstituted $C_5$ to $C_{10}$ cyclic alkylene group, and a and b are each independently an integer from 0 to 4.

As used herein, the term "substituted" means that a hydrogen atom is substituted with a substituent, such as a halogen atom, a $C_1$ to $C_{10}$ alkyl group, a $C_1$ to $C_{10}$ haloalkyl group, a $C_6$ to $C_{10}$ aryl group, a $C_1$ to $C_{10}$ alkoxy group, or combinations thereof.

The repeat unit represented by Formula 1 may be present in the polycarbonate resin in an amount of about 5 mol % to about 95 mol %, preferably about 10 mol % to about 90 mol %, more preferably about 30 mol % to about 85 mol %. Within this range, the polycarbonate resin can exhibit excellent scratch resistance without deterioration in transparency.

Further, the repeat unit represented by Formula 2 may be present in an amount of about 5 mol % to about 95 mol %, preferably about 10 mol % to about 50 mol %, more preferably about 20 mol % to about 40 mol %. Within this range, the polycarbonate resin can exhibit excellent tensile elongation without deterioration in transparency.

The polycarbonate resin may be a terpolymer which further includes a repeat unit represented by Formula 3.

[Formula 3]

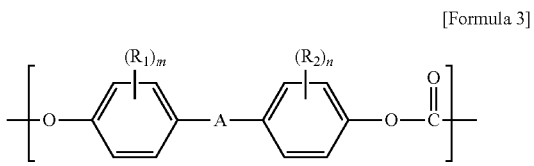

In Formula 3, A is a single bond, a substituted or unsubstituted $C_1$ to $C_{30}$ hydrocarbon group, an O or S-containing $C_1$ to $C_{30}$ hydrocarbon group, a halogen acid ester group, a carbonic acid ester group, CO, S or $SO_2$; $R_1$ and $R_2$ are each independently a substituted or unsubstituted $C_1$ to $C_6$, preferably $C_1$ to $C_3$ alkyl group; and m and n are each independently an integer from 0 to 4. Here, the same repeat unit as the repeat unit represented by Formula 1 (where A is a propylene group, $R_1$ and $R_2$ are a methyl group, m and n are 1, and substitution is performed at the 3,3' position) is excluded.

As used herein, unless specified otherwise, the term "hydrocarbon group" may refer to a linear, branched or cyclic saturated or unsaturated hydrocarbon group, wherein a "branched" type may include two or more carbon atoms and a "cyclic" type may include four or more carbon atoms. In addition, unless specified otherwise, the term "alkyl group" refers to a linear, branched or cyclic alkyl group.

In one embodiment, A may be a single bond, a substituted or unsubstituted $C_1$ to $C_{30}$ alkylene group, a substituted or unsubstituted $C_2$ to $C_5$ alkenylene group, a substituted or unsubstituted $C_2$ to $C_5$ alkylidene group, a substituted or unsubstituted $C_5$ to $C_6$ cycloalkylene group, a substituted or unsubstituted $C_5$ to $C_6$ cycloalkenylene group, a substituted or unsubstituted $C_5$ to $C_{10}$ cycloalkyldiene group, a substituted or unsubstituted $C_6$ to $C_{30}$ arylene group, a substituted or unsubstituted $C_1$ to $C_{20}$ alkoxylene group, a halogen acid ester group, a carbonic acid ester group, CO, S or $SO_2$; and $R_1$ and $R_2$ may be each independently a substituted or unsubstituted $C_1$ to $C_{30}$ alkyl group or a substituted or unsubstituted $C_6$ to $C_{30}$ aryl group.

The repeat unit represented by Formula 3 may be present in an amount of about 0.01 to about 250 parts by mole, preferably about 0.01 to about 90 parts by mole, more preferably about 0.1 to about 80 parts by mole, still more preferably about 5 to about 70 parts by mole, based on 100 parts by mole of the repeat units represented by Formulae 1 and 2. Within this range, the polycarbonate can exhibit excellent scratch resistance and tensile elongation without deterioration in transparency.

The polycarbonate resin according to the present invention may have a scratch width of about 310 µm or shorter, preferably about 100 to about 290 µm, as measured by a ball-type scratch profile (BSP) test. Within this range, the polycarbonate resin can be used alone without a protective film.

The polycarbonate resin may have a tensile elongation at 25° C. of about 40% to about 100%, preferably about 50% to about 95% as measured in accordance with ASTM D638. Within this range, the polycarbonate resin can be formed into a roll-shaped film.

The polycarbonate resin may have a pencil hardness of F or higher, preferably F to 2H at a load of 500 g, as measured in accordance with ASTM D3362. Within this range, the polycarbonate resin can be used alone without a protective film.

The polycarbonate resin according to the present invention may be prepared by any general method of preparing a polycarbonate resin, for example, by reaction (for example, transesterification) of a carbonate precursor with a diol mixture containing a diol(3,3'-DMBPA) represented by Formula 4 and a diol represented by Formula 5.

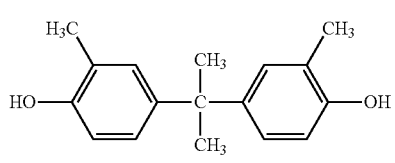

[Formula 4]

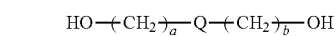

[Formula 5]

In Formula 5, Q is a substituted or unsubstituted $C_5$ to $C_{10}$ cyclic alkylene group, and a and b are each independently an integer from 0 to 4.

Examples of the diol represented by Formula 5 include 1,2-cyclopentanediol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,2-cycloheptanediol, 1,3-cycloheptanediol, 1,4-cycloheptanediol, 1,2-cyclooctanediol, 1,3-cyclooctanediol, and 1,4-cyclooctanediol, without being limited thereto. Preferably, 1,4-cyclohexanedimethanol is used.

3,3'-DMBPA may be present in an amount of about 5 mol % to about 95 mol %, preferably about 10 to about 90 mol %, more preferably about 30 to about 80% in the entire diol mixture. Within this range, the polycarbonate resin can exhibit excellent scratch resistance without deterioration in transparency.

The diol represented by Formula 5 may be present in an amount of about 5 mol % to about 95 mol %, preferably about 10 to about 50 mol %, more preferably about 20 to about 40% in the entire diol mixture. Within this range, the polycarbonate resin can exhibit excellent tensile elongation without deterioration in transparency.

In one embodiment, the diol mixture may further include an aromatic dihydroxy compound represented by Formula 6 to prepare the terpolymer.

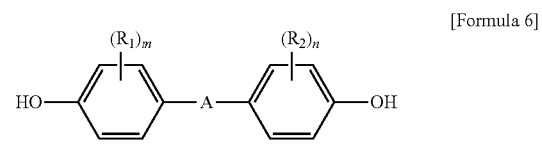

[Formula 6]

In Formula 6, A, $R_1$, $R_2$, m and n are defined as in Formula 3. Here, the same compound as 3,3'-DMBPA (A is a propylene group, $R_1$ and $R_2$ are a methyl group, m and n are 1, and substitution is performed at the 3,3' position) is excluded.

Examples of the aromatic dihydroxy compound may include 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-cyclohexane, 2,2-bis-(3-chloro-4-hydroxyphenyl)-propane, and 2,2-bis-(3,5-dichloro-4-hydroxyphenyl)-propane, without being limited thereto. The aromatic dihydroxy compound is preferably 2,2-bis-(4-hydroxyphenyl)-propane, 2,2-bis-(3,5-dichloro-4-hydroxyphenyl)-propane, or 1,1-bis-(4-hydroxyphenyl)-cyclohexane, more preferably 2,2-bis-(4-hydroxyphenyl)-propane, commonly referred to as bisphenol A.

The aromatic dihydroxy compound represented by Formula 6 may be present in an amount of about 0.01 to about 250 parts by mole, preferably about 0.01 to about 90 parts by mole, more preferably about 0.1 to about 80 parts by mole, still more preferably about 5 to 70 parts by mole, based on 100 parts by mole of the diols represented by Formulae 4 and 5. Within this range, the polycarbonate resin can exhibit excellent tensile elongation without deterioration in transparency.

Examples of the carbonate precursor used in the present invention may include phosgene, triphosgene, diaryl carbonate, and mixtures thereof. Examples of diaryl carbonate may include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate, without being limited thereto. These may be used alone or in combination thereof. Preferably, diphenyl carbonate is used.

A molar ratio (diol mixture/carbonate precursor) of the diol mixture to the carbonate precursor ranges, for example, from about 0.7 to about 1.0, preferably from about 0.8 to about 0.9. Within this range of the molar ratio, the polycarbonate resin can exhibit excellent mechanical properties.

In one embodiment, the reaction of the diol mixture and the polycarbonate precursor may be transesterification, which is performed at about 150° C. to about 300° C., preferably about 160° C. to about 280° C., more preferably about 190° C. to about 260° C. under reduced pressure. Within this temperature range, the reaction is advantageously performed in view of reaction speed and decrease in side reaction.

Further, transesterification is advantageously performed, in view of reaction speed and decrease in side reaction, under a reduced pressure of about 100 torr or less, for example, about 75 torr or less, preferably about 30 torr or less, more preferably about 1 torr or less, for at least 10 minutes or more, preferably about 15 minutes to about 24 hours, more preferably about 15 minutes to about 12 hours.

Transesterification may be performed in the presence of a catalyst. Any typical catalyst used in transesterification may be employed as the catalyst, examples of which may include alkali metal catalysts, alkaline earth metal catalysts, and the like. Examples of the alkali metal catalysts may include LiOH, NaOH, and KOH, without being limited thereto. These catalysts may be used alone or in combination thereof. The catalyst is present in an amount of, for example, about $1 \times 10^{-8}$ to about $1 \times 10^{-3}$ moles, preferably about $1 \times 10^{-7}$ to about $1 \times 10^{-4}$ moles per mole of the diol mixture. Within this range, the polycarbonate resin can exhibit sufficient reactivity while minimizing production of byproducts by side reaction, thereby improving thermal stability and color stability.

The polycarbonate resin of the present invention may further include a sulfonic acid ester compound represented by Formula 7, as needed. That is, the sulfonic acid ester compound represented by Formula 7 may be added to the polymer prepared by the aforementioned method to inactivate the catalyst.

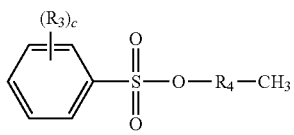
[Formula 7]

In Formula 7, $R_3$ is a substituted or unsubstituted $C_1$ to $C_{20}$ alkyl group; $R_4$ is a substituted or unsubstituted $C_{11}$ to $C_{20}$ alkylene group; and c is an integer from 0 to 5.

Examples of the sulfonic acid ester compound represented by Formula 7 may include dodecyl p-toluene sulfonic acid ester, octadecyl p-toluene sulfonic acid ester, dodecyl (dodecyl benzene) sulfonic acid ester, octadecyl (dodecyl benzene) sulfonic acid ester, and the like.

The sulfonic acid ester compound may be present in an amount of about 0.0001 to about 0.001 parts by weight, preferably about 0.0003 to about 0.0008 parts by weight, based on about 100 parts by weight of the polycarbonate resin. Within this range, the polycarbonate resin can exhibit excellent thermal stability or hydrolysis resistance.

As a method of adding the sulfonic acid ester compound to the polycarbonate resin, in one embodiment, the sulfonic acid ester compound may be introduced directly into a reactor containing the completely reacted polycarbonate resin to prepare the polycarbonate resin through in-situ reaction. In another embodiment, a polycarbonate resin prepared by transesterification may be mixed with the sulfonic acid ester compound in an extrusion process. After the polycarbonate prepared by the reaction is transferred to an extruder, the sulfonic acid ester compound is introduced into the extruder, followed by extruding, thereby preparing a polycarbonate resin in pellet form.

As needed, the polycarbonate resin according to the present invention may further include common additives upon extrusion when the sulfonic acid ester compound is added. Examples of the additives may include flame retardants such as tris(2,4-di-tert-butylphenyl)phosphate, antioxidants such as octadecyl 3-(3,5-di-tert-4-hydroxyphenyl)propionate, antibacterial agents, release agents, heat stabilizers, photostabilizers, compatibilizers, dyes, inorganic additives, fillers, plasticizers, impact modifiers, chemical admixtures, lubricants, antistatic agents, pigments, weather-resistant agents, and UV blocking agents, without being limited thereto. These additives may be used alone or in combination thereof.

The polycarbonate resin according to the present invention exhibits excellent scratch resistance, transparency, tensile elongation, and the like, and thus may be applied to various products. For example, the polycarbonate resin may be applied to optical materials for optical films, optical disk substrates, various lenses, prisms and optical fiber, exterior materials of electronic/electric products, office machines, automobile components, and the like. In particular, the polycarbonate resin may be used without a protective film due to excellent scratch resistance, be formed into a roll-shaped film due to excellent tensile elongation, and be very useful for an optical film due to excellent transparency. A molded article using the polycarbonate resin may be manufactured by any general molding method, for example, extrusion molding, injection molding, vacuum molding, cast molding, blow molding, calender molding, and the like. These molding methods are well known to those skilled in the art.

Mode for Invention

Hereinafter, the present invention will be described in more detail with reference to examples. It should be understood that these examples are provided for illustration only and are not to be construed in any way as limiting the present invention.

EXAMPLES

Examples 1 to 5 and Comparative Examples 1 to 6

According to compositions as listed in Table 1, based on 100 parts by mole of a diol mixture containing 2,2-bis(4-hydroxyphenyl)propane (BPA), 3,3'-dimethyl bisphenol A (DMBPA) and 1,4-cyclohexanedimethanol (CHDM), 102.8 parts by mole of diphenyl carbonate and 150 ppb of KOH (based on 1 mole of diphenyl carbonate) were sequentially added to a reactor, and oxygen was removed from the reactor using nitrogen. The reactor was heated to 160° C. and then to 190° C., at which reaction was performed for 6 hours. After 6 hours, the reactor was heated again to 210° C. and maintained at a pressure of 100 torr for 1 hour. Next, the reactor was heated to 260° C. and maintained at a pressure of 20 torr for 1 hour, after which the pressure of the reactor was reduced to and maintained at 0.5 torr for 1 hour, thereby preparing a molten polycarbonate resin. Subsequently, 100 parts by weight of the molten polycarbonate resin was mixed with 0.0005 parts by weight of a sulfonic acid compound, 0.03 parts by weight of an antioxidant, and 0.05 parts by weight of a phosphorous heat stabilizer, followed by kneading and extruding using an extruder, thereby preparing a polycarbonate resin in pellet form.

TABLE 1

|  | Example | | | | | Comparative example | | | | | |
|---|---|---|---|---|---|---|---|---|---|---|---|
|  | 1 | 2 | 3 | 4 | 5 | 1 | 2 | 3 | 4 | 5 | 6 |
| DMBPA (mol %) | 20 | 50 | 50 | 50 | 90 | — | 100 | — | 3 | 97 | 3 |
| CHDM (mol %) | 10 | 20 | 30 | 50 | 10 | — | — | 50 | 3 | 3 | 97 |
| BPA (mol %) | 79 | 30 | 20 | — | — | 100 | — | 50 | 94 | — | — |

Comparative Example 7

100 parts by weight of a resin containing 65 wt % of a polycarbonate resin (L-1250W, manufactured by Teijin Kasei K.K.) and 35 wt % of a polymethylmethacrylate resin (L84, manufactured by Teijin Kasei K.K.) was mixed in a general mixer with 0.0005 parts by weight of a sulfonic acid compound, 0.03 parts by weight of an antioxidant, and 0.05 parts by weight of a phosphorous heat stabilizer and extruded using a biaxial extruder with L/D=29 and Φ=45 mm, thereby preparing a pellet-form extruded product.

Property Evaluation

The pellets prepared in Examples 1 to 5 and Comparative examples 1 to 7 were formed into 2.5 mm-thick specimens and tensile specimens at a molding temperature of 270° C. and a mold temperature of 70° C. using an injection machine (DHC 120WD, 120 ton, Dongshin EnTech Co., Ltd.). Properties of the pellets were evaluated by the following methods and results are shown in Table 2.

(1) Transparency: To evaluate transparency (degree of transparency), haze (%) and transmittance (%) of each 2.5 mm-thick specimen were evaluated using a haze meter NDH 2000 manufactured by Nippon Denshoku Industries Co., Ltd. in accordance with ASTM D1003. Transmittance (total transmittance (total transmitted light (TT)), %) was calculated as total quantity of diffused transmitted light (DF) and parallel transmitted light (PT), and haze (%) was calculated by diffused transmitted light (DF)/total transmitted light (TT).

(2) Tensile elongation (%): Tensile elongation of each tensile specimen was evaluated in accordance with ASTM D638.

(3) Ball-type scratch profile (BSP): A 10 to 20 mm-long scratch was made on the surface of a 90 mm long×50 mm wide×2.5 mm thick specimen under a load of 1,000 g at a scratching speed of 75 mm/min using a spherical metal tip having a diameter of 0.7 mm. The profile of the scratch was subjected to surface scanning by a metal stylus tip having a diameter of 2 μm using a contact surface profiler (XP-1) manufactured by Ambios Technology Inc., thereby evaluating scratch width (unit: μm) as a measure of scratch resistance. Here, a shorter scratch width indicates a higher scratch resistance value.

(4) Pencil hardness: Pencil hardness was measured under a load of 500 g according to ASTM D3362.

TABLE 2

| | Example | | | | | Comparative example | | | | | | |
|---|---|---|---|---|---|---|---|---|---|---|---|---|
| | 1 | 2 | 3 | 4 | 5 | 1 | 2 | 3 | 4 | 5 | 6 | 7 |
| Haze (%) | 1.2 | 0.8 | 0.7 | 0.6 | 1.1 | 0.8 | 1.2 | 0.3 | 0.8 | 1.1 | 1.0 | 83.5 |
| Transmittance (%) | 89.8 | 90.1 | 90.4 | 90.8 | 89.9 | 89.8 | 89.5 | 90.3 | 89.8 | 89.6 | 90.5 | 15.2 |
| Tensile elongation (%) | 75 | 68 | 82 | 93 | 58 | 110 | 35 | 108 | 112 | 38 | 142 | 8 |
| BSP (width, μm) | 285 | 255 | 254 | 256 | 225 | 336 | 208 | 332 | 331 | 212 | 328 | 258 |
| Pencil hardness | F | H | H | H | 2H | 2B | 2H | 2B | 2B | 2H | 2B | H |

As can be seen from the results shown in Table 2, the polycarbonate resins (Examples 1 to 5) according to the present invention exhibited excellent properties in terms of transparency, tensile elongation, scratch resistance and balance between these physical properties and thus were useful for an optical film. On the contrary, the polycarbonate resins prepared in Comparative Examples 1 to 7 had considerably reduced scratch resistance or considerably low tensile elongation and exhibited unsatisfactory balance between physical properties.

It should be understood that various modifications, changes, alterations, and equivalent embodiments can be made by those skilled in the art without departing from the spirit and scope of the invention.

The invention claimed is:

1. A polycarbonate resin comprising a repeat unit represented by Formula 1; and a repeat unit represented by Formula 2:

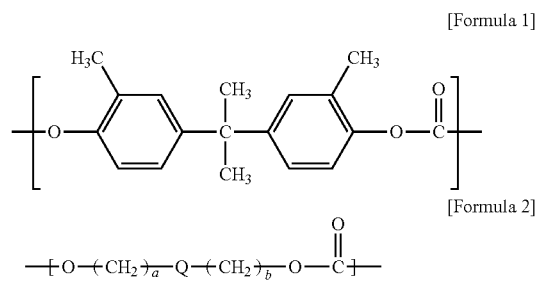

[Formula 1]

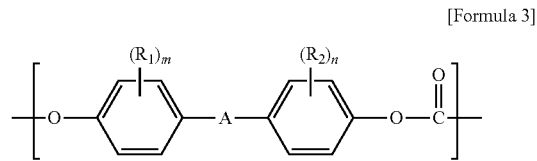

[Formula 2]

wherein in Formula 2, Q is a substituted or unsubstituted C5 to C10 cyclic alkylene group, and a and b are each independently an integer from 0 to 4.

2. The polycarbonate resin according to claim 1, wherein the repeat unit represented by Formula 1 is present in an amount of about 5 mol % to about 95 mol %, and the repeat unit represented by Formula 2 is present in an amount of about 5 mol % to about 95 mol %.

3. The polycarbonate resin according to claim 1, wherein the polycarbonate resin further comprises a repeat unit represented by Formula 3:

[Formula 3]

wherein in Formula 3, A is a single bond, a substituted or unsubstituted C1 to C30 hydrocarbon group, an O or S-containing C1 to C30 hydrocarbon group, a halogen acid ester group, a carbonic acid ester group, CO, S or $SO_2$; $R_1$ and $R_2$ are each independently a substituted or unsubstituted C1 to C6 alkyl group; and m and n are each independently an integer from 0 to 4.

4. The polycarbonate resin according to claim 3, wherein the repeat unit represented by Formula 3 is present in an amount of about 0.01 to about 250 parts by mole based on 100 parts by mole of the repeat units represented by Formulae 1 and 2.

5. The polycarbonate resin according to claim 1, wherein the polycarbonate resin has a scratch width of about 310 μm or shorter, as measured by a ball-type scratch profile (BSP) test.

6. The polycarbonate resin according to claim 1, wherein the polycarbonate resin has a tensile elongation of about 40% to about 100% at 25° C.

7. The polycarbonate resin according to claim 1, wherein the polycarbonate resin has a pencil hardness of F or higher.

8. A method of preparing a polycarbonate resin comprising:
reacting a carbonate precursor with a diol mixture containing a diol represented by Formula 4 and a diol represented by Formula 5:

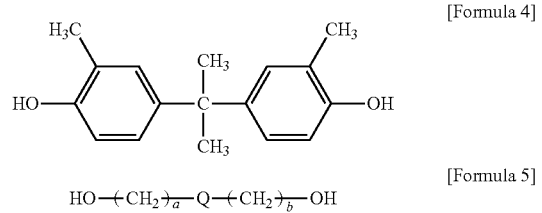

[Formula 4]

[Formula 5]

wherein in Formula 5, Q is a substituted or unsubstituted C5 to C10 cyclic alkylene group, and a and b are each independently an integer from 0 to 4.

9. The method of preparing a polycarbonate resin according to claim 8, wherein the diol represented by Formula 4 is present in an amount of about 5 mol % to about 95 mol % in the entire diol mixture, and the diol represented by Formula 5 is present in an amount of about 5 mol % to about 95 mol % in the entire diol mixture.

10. The method of preparing a polycarbonate resin according to claim 8, wherein the diol mixture further comprises an aromatic dihydroxy compound represented by Formula 6:

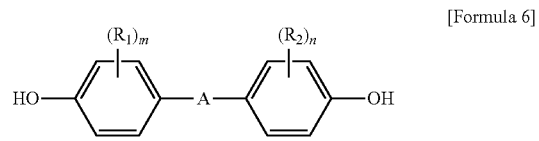

[Formula 6]

wherein in Formula 6, A is a single bond, a substituted or unsubstituted C1 to C30 hydrocarbon group, an O or S-containing C1 to C30 hydrocarbon group, a halogen acid ester group, a carbonic acid ester group, CO, S or SO$_2$; R$_1$ and R$_2$ are each independently a substituted or unsubstituted C1 to C6 alkyl group; and m and n are each independently an integer from 0 to 4.

11. The method of preparing a polycarbonate resin according to claim 10, wherein the aromatic dihydroxy compound represented by Formula 6 is present in an amount of about 0.01 to about 250 parts by mole based on 100 parts by mole of the diols represented by Formulae 4 and 5.

12. A molded article comprising the polycarbonate resin according to claim 1.

* * * * *